United States Patent Office 3,127,360
Patented Mar. 31, 1964

3,127,360
METHOD OF IMPREGNATING SYNTHETIC RESIN PARTICLES WITH A LOWER ALIPHATIC GAS TO RENDER SAID PARTICLES FOAMABLE
James M. Harrison, Fort Worth, Tex., assignor to Crown Machine and Tool Company, Inc., Fort Worth, Tex., a corporation of Texas
No Drawing. Filed June 13, 1961, Ser. No. 116,669
9 Claims. (Cl. 260—2.5)

This invention relates to a method of preparing expandable plastic material, for example, discrete polystyrene plastic particles, for use as a molding medium. The invention deals specifically with a method of preventing combustion in a process of impregnating said plastic material with an expandable combustible gas.

A primary purpose of the present invention is to provide a method of impregnating polystyrene or the like with an expandable gas to prepare said polystyrene for use as a foamable plastic material with process steps for the prevention of combustion of the impregnating or charging gas.

A further purpose is a method of impregnating polystyrene or like plastic particles with an expandable combustible gas, such as propane, butane and the like, with process steps which allow safe withdrawal and transfer of impregnated plastic particles.

Another purpose is a method of impregnating plastic particles with a combustible gas which can be used in on-site impregnation.

Other purposes will appear in the ensuing specification and claims.

It is presently the practice in the making of plastic articles to use a foamable plastic as a molding medium. This foamable plastic may be in discrete particle form, for example beads, and may be polystyrene or the like. To make the foamable plastic bead material the plastic is impregnated with an expanding combustible gas such as butane, propane, or the like, or combinations of these gases. Petroleum ether, such as pentane, isopentane and the like, are also used in the liquid form, but impregnate the plastic particles as a gas by rapid evaporation.

When the beads are subsequently heated, after being impregnated, for example, to 230–240 degrees F., the gas impregnated in the individual beads expands, causing the beads to expand many times their original size.

The practice is to apply an intermediate temperature in the neighborhood of 190 degrees F., for example, before the beads are fully foamed or expanded in the mold cavity. This process is called pre-foaming and it expands each bead in proportion to its original diameter, though not to the extent to which it will be finally expanded. Pre-foaming is used to insure that the molding medium is properly distributed in the mold cavity prior to compression or final heating. If an unprefoamed charge is used, the charge may only fill a small percentage of the cavity during the foaming operation and hence an incomplete article would be manufactured.

Whereas the invention is particularly described in connection with a process for impregnating polystyrene beads, it should be realized that those steps of the present process relating particularly to preventing combustion of the charging gas are suitable for use in any process whereby like plastic materials are impregnated with an expanding combustible gas. By the term combustible gas, I mean any chemical charge accompanied by either heat, light or sound.

In performing my method of impregnating polystyrene particles, an air and gas-tight container of sufficient size to hold a charge (200–600 lbs. for example) of plastic beads and a source of impregnating gas is provided. It should be mentioned that the bead material preferably used in this process contains polystyrene combined with butadiene-styrene copolymer synthetic rubber, more often referred to as buna S or GR–S or government rubber type S. This combination of butadiene-styrene rubber and polystyrene may be accomplished through polymerization in a well-known manner or by physical mixing. The preferred ratio in such bead material is from 2–15 percent buna S rubber content and 85–98 percent of polystyrene plastic.

The impregnating gas or the charging gas may be introduced in the gaseous form and may be propane, butane, isobutane and the like, or combinations of these gases. Liquids known as petroleum ethers may be used to wet the plastic particles and thereafter impregnate such particles after conversion to the gaseous form. Representative petroleum ethers are pentane and isopentane. I shall use the term "lower aliphatic combustible gases" in referring to the foregoing expanding and combustible gases.

After the bead material is placed in the drum or container, the container is purged or evacuated to displace all the oxygen from the tank. Evacuations can be performed by a vacuum pump or equivalent means. Preferably an inert gas such as argon, carbon dioxide, nitrogen, or the like is used to purge or displace the oxygen in the container. The lower aliphatic combustible gases which are suitable for use as a charging agent are explosive in the presence of oxygen. Accordingly, it is necessary to evacuate or purge the container as stated herein to remove all oxygen. A spark, such as that generated by rubbing polystyrene with metal, could ignite an explosive mixture of oxygen and one of the lower aliphatic gases mentioned.

After the container has been exhausted to remove all oxygen, a sufficient amount of the lower aliphatic gas is placed in the tank to impregnate a predetermined amount, by weight, of said gas into the polystyrene bead material. The gas is placed under pressure in the tank, and then the tank is sealed.

After the container is sealed, it is agitated for a period of from 4–24 hours. The container is rotated so that the bead material will intimately commingle in the gaseous atmosphere to facilitate subsequent impregnation. In this connection, it should be realized that the gaseous atmosphere is directly created with an external source of a gas such as butane, propane and the like, or liquid petroleum ether is used to first wet the interior of the tank which then drys and impregnates the polystyrene particles.

After the agitation, the mixture of polystyrene bead material and the lower aliphatic combustible gas is stored for a period not less than three days, and preferably 3–5 days. The material may be stored in the chamber which was used as the impregnating zone while providing a small vent open to the atmosphere, or the impregnated particles may be transferred to a fiber container for storage. In some applications it may be desirable to store the material under pressure, but preferably the container is open to the atmosphere. A fiber container is very advantageous.

After storage, the container is opened at the top and a gas inert to combustion such as argon, carbon dioxide, nitrogen, or the like and which is lighter than the combustible gas is introduced through the top of the container. At the same time the bottom of the container is opened to exhaust or to atmosphere. As the inert gas is lighter than the combustible gas, it will force some of the combustible gas out of the bottom to exhaust. At this point a combustion analyzer may be used to test the mixture and indicate the combustion properties of it. In other words, it is necessary to ascertain whether or not the mixture within the tank is at all combustible. In production this may be done by purging with a set volume of gas. If the mixture is not combustible, it is continually forced out of the tank by the inert gas above it. After the gas is completely discharged, the bead material may be removed. If storage is provided in a fiber container, then it is not necessary to conduct the post-storage purging step.

Normally the combustible gas and the impregnated material is not removed from the storage container until the polystyrene bead material is to be pre-foamed. By pre-foaming, I refer to that process whereby an initial foaming temperature, for example, 190 degrees F., is applied to a bead charge. The pre-foamed charge will contain an operable amount of impregnated gas for approximately three days. After this time, the loss of the gas becomes a factor and under normal circumstances the molding operation is effected detrimentally. In other words, the impregnated material may be stored until it is to be pre-foamed. This storage period should be at least about three days and may be up to thirty days. Once the material is pre-foamed, it must be used within three days.

The process described above has many advantages and is particularly suited for on-site impregnation, as contrasted to the more conventional process of impregnating the beads and then shipping them to the point of use. Foremost among these advantages is the fact that there is no possibility of an explosion due to oxygen combining with the combustible gas in the presence of a spark, for example, caused by polystyrene rubbing against metal. A further advantage is that no violent agitation is necessary to achieve a proper amount of impregnation. In addition, the whole operation is performed at room temperatures in a completely dry atmosphere. There is no clumping or sticking together of the plastic beads which is encountered in many processes of this type.

Whereas I have mentioned butane, propane and pentane as suitable gases for use in impregnating or charging the bead material, it should be realized that there are other gases, as well as combinations of these gases which are also suitable. In addition, the inert gas that is used for both purging or exhausting the tank prior to impregnation and for later removing the combustible gas is not limited to argon, carbon dioxide or nitrogen. The successful operation of this process requires a combustible gas which will impregnate the plastic particles, a gas inert to combustion for displacing oxygen and purging the combustible gas; and an inert gas that is lighter than the combustible gas for the purging step.

Although the process has been described as using a sequence of steps whereby the tank or drum is charged with bead material prior to purging, it may also be satisfactory to exhaust or purge the tank first.

Whereas the preferred form of the invention has been described herein, it should be realized that there are many modifications, substitutions and alterations thereto within the scope of the following claims.

I claim:

1. A method for preparing gas impregnated synthetic plastic resin particles with minimal risk of combustion which comprises evacuating oxygen from a contained zone charged with the plastic particles, introducing into said zone an expandable and combustible impregnating lower aliphatic gas, agitating the mixture of combustible gas and plastic particles to allow said combustible gas to impregnate the plastic particles, thereafter introducing into an upper opening of the contained zone a gas inert to combustion and lighter than said combustible gas, and exhausting the combustible gas from a lower opening in the contained zone.

2. A method for preparing gas impregnated synthetic plastic resin particles with minimal risk of combustion which comprises displacing oxygen from a contained zone with a gas inert to combustion, said contained zone charged with the plastic particles, introducing into said contained zone an expandable and combustible impregnating lower aliphatic gas, agitating the mixture of combustible gas and plastic particles to allow said combustible gas to impregnate said plastic particles, thereafter introducing into an upper opening of the contained zone a gas inert to combustion and lighter than said combustible gas and exhausting the combustible gas from a lower opening in the contained zone.

3. A method for preparing gas impregnated synthetic plastic resin particles with minimal risk of combustion which comprises displacing oxygen from a contained zone with a gas inert to combustion, said contained zone charged with the plastic particles, introducing into said contained zone an expandable and combustible impregnating lower aliphatic gas, agitating the mixture of lower aliphatic gas and plastic particles to allow said combustible gas to impregnate said plastic particles, thereafter introducing into an upper opening of the contained zone a gas inert to combustion and lighter than said combustible gas, exhausting the combustible gas from a lower opening in the contained zone, and analyzing the gas so exhausted to determine its combustive properties.

4. A process according to claim 1 wherein the inert gas is nitrogen and the plastic particles are polystyrene.

5. A process according to claim 2 where the inert gas in both steps of the process is nitrogen and the plastic particles are polystyrene.

6. A process according to claim 3 where the inert gas in both steps of the process is nitrogen and the plastic particles are polystyrene.

7. A method for preparing gas impregnated polystyrene particles with minimal risk of combustion which comprises displacing oxygen from a contained zone with a gas inert to combustion, said contained zone charged with the polystyrene particles, introducing into said contained zone an expandable and combustible impregnating lower aliphatic gas, agitating the mixture of combustible gas and polystyrene particles to allow said gas to impregnate said polystyrene particles, storing the impregnated polystyrene particles for at least about three days, thereafter introducing into an upper opening of the contained zone a gas inert to combustion and lighter than said lower aliphatic gas, exhausting the combustible gas from a lower opening in the contained zone, analyzing the gas so exhausted to determine its combustive properties, and thereafter removing the polystyrene particles from the container.

8. A method according to claim 7 where the impregnated polystyrene particles are stored for at least about three days in a pressure tight contained zone.

9. A method for preparing gas impregnated polystyrene particles with minimal risk of combustion which comprises displacing oxygen from a contained zone with a gas inert to combustion, said contained zone charged with the polystyrene particles, introducing into said contained zone an expandable impregnating lower aliphatic gas, agitating the mixture of lower aliphatic gas and polystyrene particles to allow said gas to impregnate said polystyrene particles, introducing into an upper opening of the contained zone a gas inert to combustion and lighter than said lower aliphatic combustible gas, exhausting the combustible gas from a lower opening in the contained zone, analyzing the exhausted gas to determine its combustive properties, removing the impregnated polystyrene particles from the contained zone at a safe combustive level, and storing said impregnated polystyrene particles in a chamber vented to the atmosphere for at least about three days.

References Cited in the file of this patent
UNITED STATES PATENTS
2,950,261   Buchholtz et al. _____ Aug. 23, 1960